R. PARSONS.
CAKE SUPPORTING TROLLEY HOOK.
APPLICATION FILED NOV. 12, 1913.
1,201,753.  Patented Oct. 17, 1916.
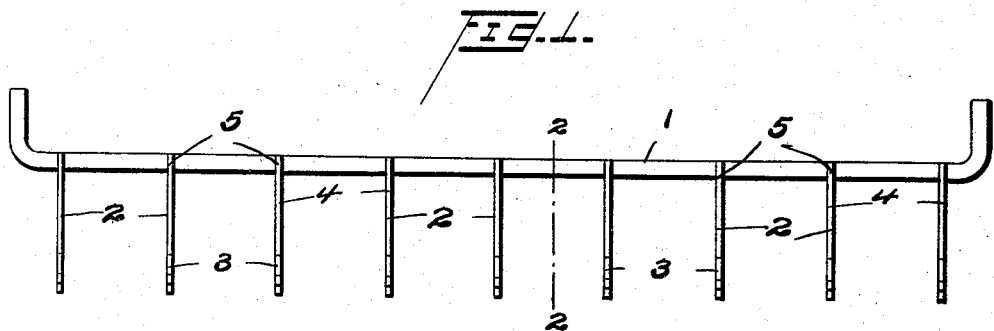
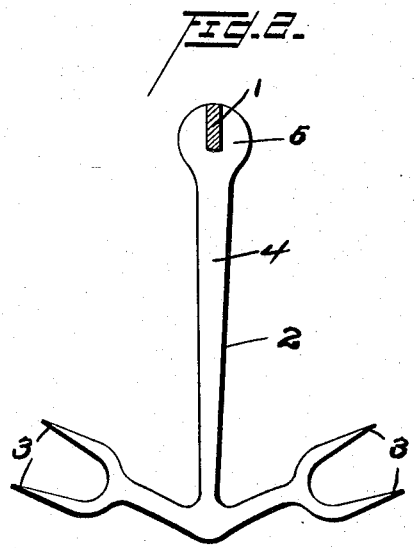
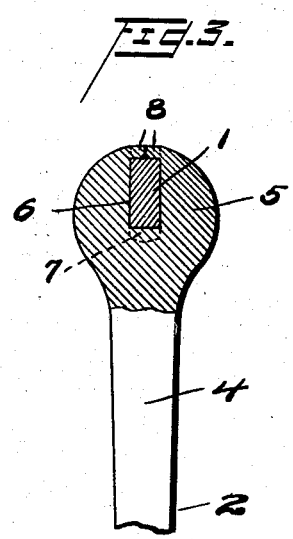
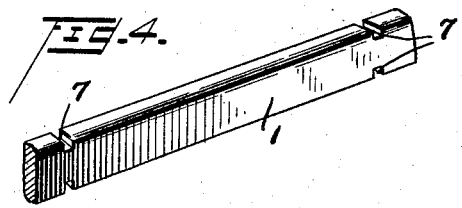
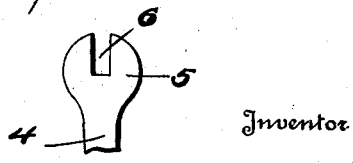
Inventor
Richmond Parsons
By Joshua R. H. Potts
Attorney
Witnesses
Harold Strauss
C. R. Ziegler

UNITED STATES PATENT OFFICE.

RICHMOND PARSONS, OF PHILADELPHIA, PENNSYLVANIA.

CAKE-SUPPORTING TROLLEY-HOOK.

1,201,753.  Specification of Letters Patent.  Patented Oct. 17, 1916.

Application filed November 12, 1913. Serial No. 800,438.

*To all whom it may concern:*

Be it known that I, RICHMOND PARSONS, a citizen of the United States, residing at Philadelphia, in the county of Philadelphia and State of Pennsylvania, have invented certain new and useful Improvements in Cake-Supporting Trolley-Hooks, of which the following is a specification.

My invention relates to improvements in cake supporting trolley hooks, the object of the invention being to provide an improved construction of hook and supporting bar containing a number of such hooks and connect the hooks and the bar in such a manner as to rigidly hold the hooks, yet permit a single hook to be removed and replaced without disturbing the others.

A further object is to simplify the construction of devices of this character which will facilitate repairs, but which will be strong and durable so as to reduce the necessity for repairs to a minimum.

With these and other objects in view, the invention consists in certain novel features of construction and combinations and arrangements of parts as will be more fully hereinafter described and pointed out in the claim.

In the accompanying drawings: Figure 1 is a view in elevation illustrating a bar equipped with a series of my improved hooks. Fig. 2 is an enlarged view in section on the line 2—2 of Fig. 1. Fig. 3 is a view in section on an enlarged scale through the connection between the hook and the bar. Fig. 4 is a fragmentary perspective view of the bar, and Fig. 5 is a view illustrating the upright member of the hook before it is bent into locked engagement with the bar.

1 represents a bar and 2 are cake supporting hooks depending therefrom. It is customary in machines for applying the icing to small cakes to provide a large number of these bars 1 and so connect them that they move slowly and in order, first receiving the cakes on their sharp ends 3, and then dipping the cakes in the icing, afterward holding the cakes in position until the icing thoroughly dries.

The particular shape of the cake engaging portion of the hook may be varied to suit the trade and forms no part of the present invention.

Each hook has an upright member 4 which is provided at its upper end with enlargements 5 having a longitudinal recess 6 therein which receives the bar 1. Bar 1 in its upper and lower edges is formed with notches 7, and said bar is of a thickness approximating the width of the recess 6, so that it fits snugly within the recess 6.

When the parts are assembled, the recessed enlargement 5 is positioned on the bar 1 with the inner wall of the recess 6 projected into the lower notch 7 of the bar 1, while the upper end of the enlargement 5 is pressed inwardly forming tongues 8 which are pressed into the upper notch 7 of the bar 1, hence securely connecting the hook to the bar and preventing any independent movement of the hook in any direction. Should the hook become worn or injured, it can be readily replaced without disturbing any of the other hooks and the juncture is an extremely strong and durable one.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

The combination with a bar having flat parallel sides, and having a plurality of notches in its upper and lower edges, of cake supporting hooks having upright members, said upright members formed with enlarged upper ends, said enlarged upper ends having recesses therein receiving the bar, the lower walls of said recesses located in the lower notches of the bar, and the upper portions of said enlargements at opposite sides of the bar bent inwardly and together and located in the upper notches of the bar, substantially as described.

In testimony whereof I have signed my name to this specification in the presence of two subscribing witnesses.

RICHMOND PARSONS.

Witnesses:
M. E. DITTUS,
CHAS. E. POTTS.

Copies of this patent may be obtained for five cents each, by addressing the "Commissioner of Patents, Washington, D. C."